R. W. GLASNER AND M. BALCKER.
WEIGHING AND SORTING MACHINE.
APPLICATION FILED MAR. 18, 1920.
1,394,167.
Patented Oct. 18, 1921.
6 SHEETS—SHEET 6.
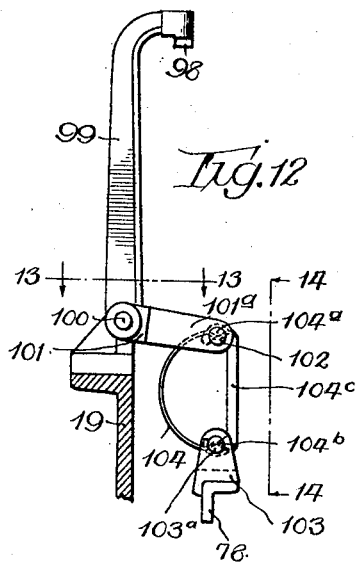
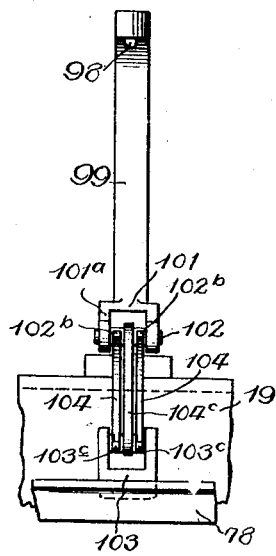
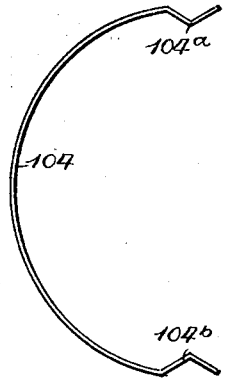
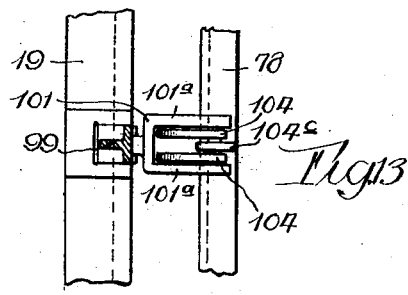
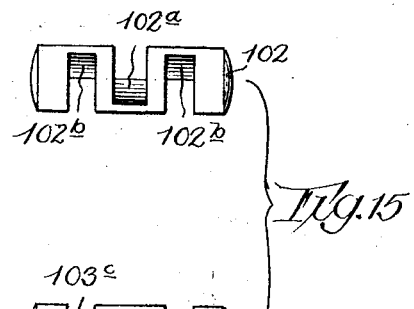
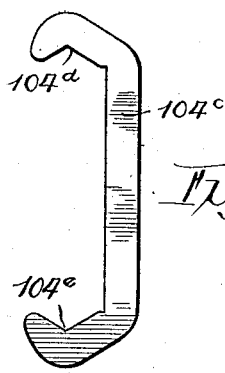
Inventors
Rudolph W. Glasner,
Martin Balcker
By [signature] Atty.

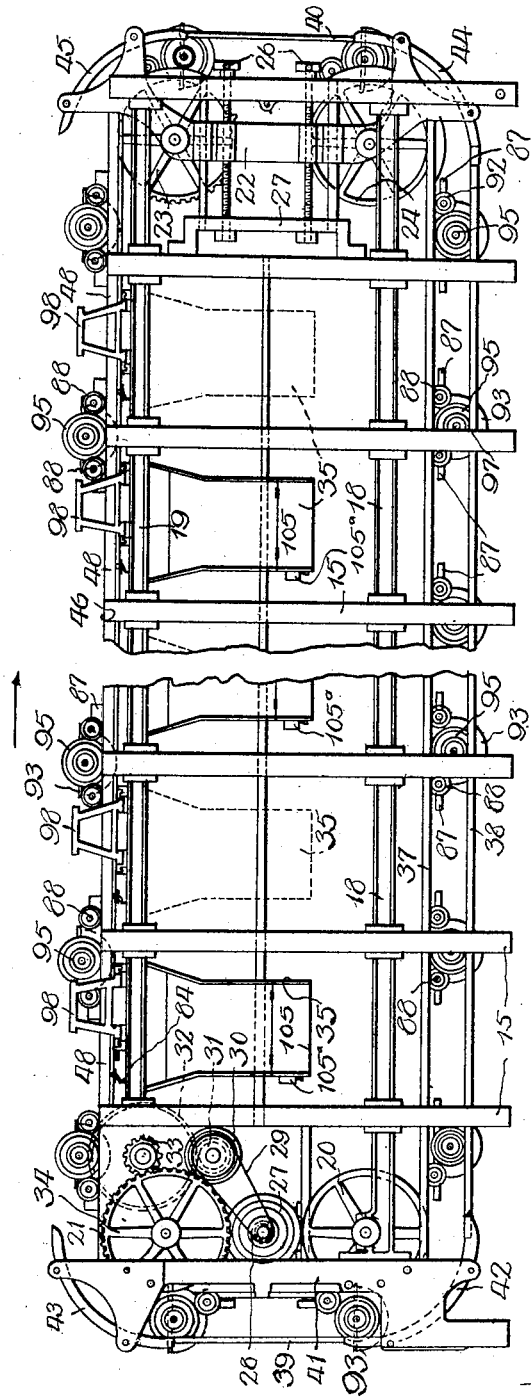

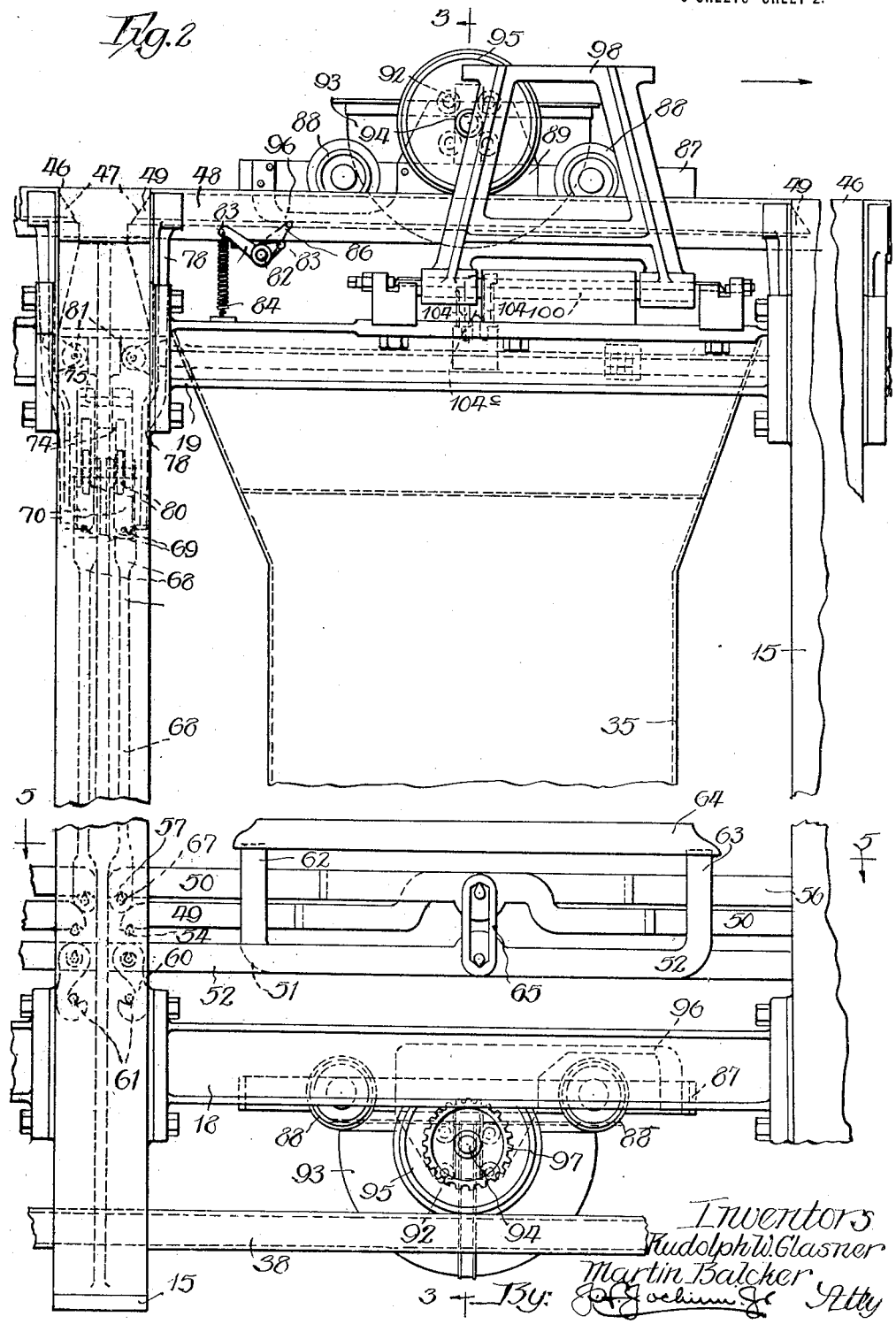

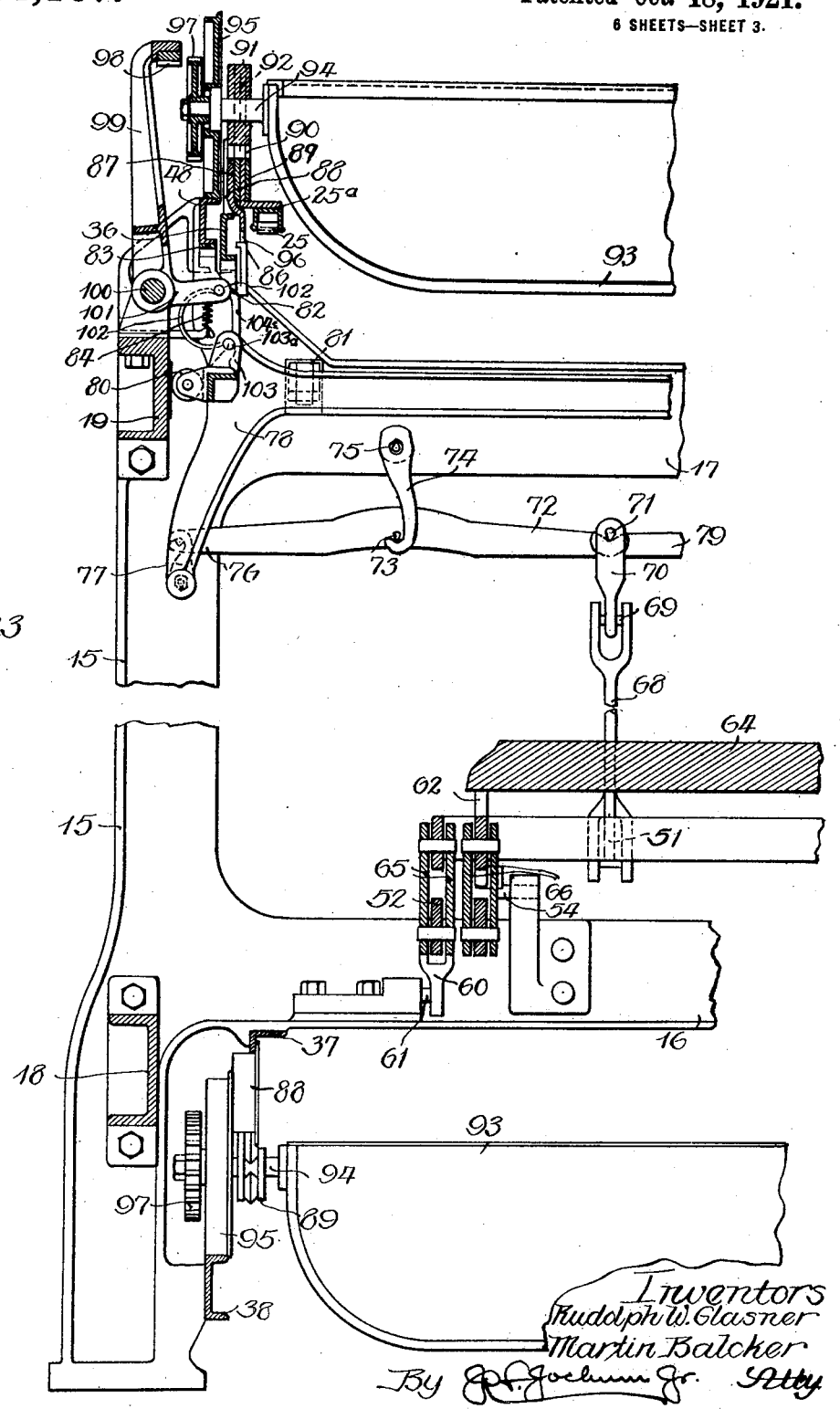

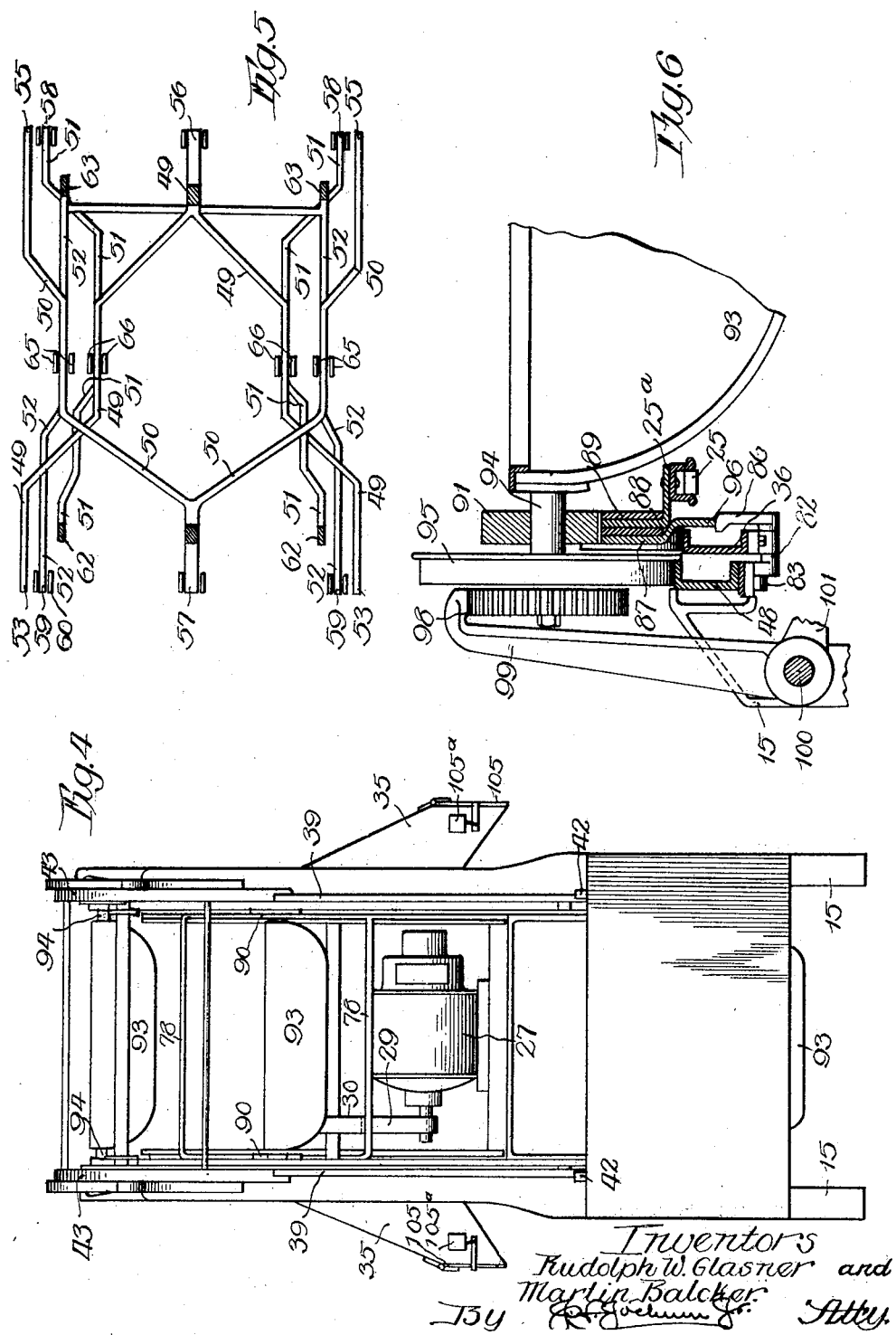

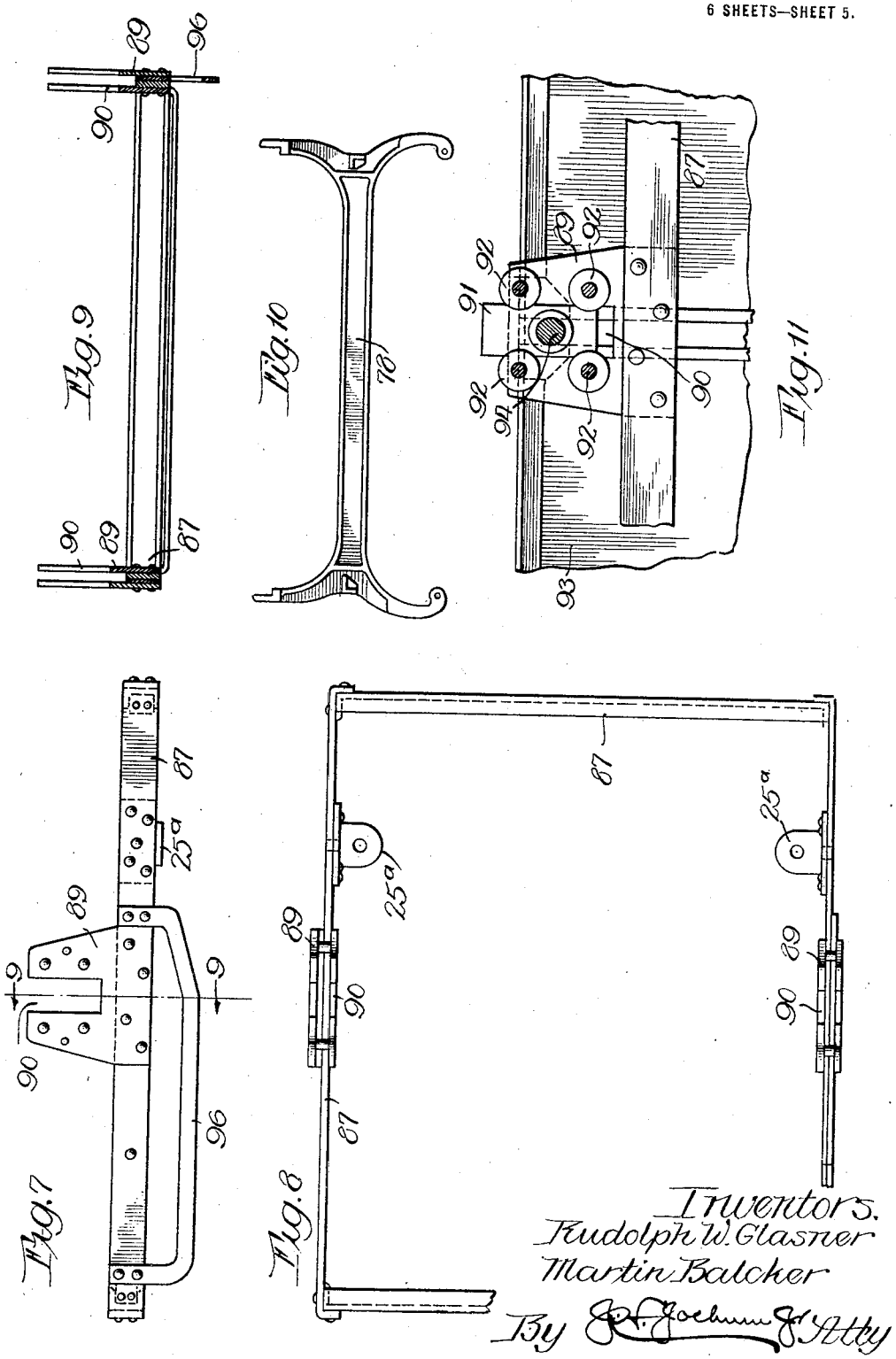

UNITED STATES PATENT OFFICE.

RUDOLPH W. GLASNER AND MARTIN BALCKER, OF CHICAGO, ILLINOIS, ASSIGNORS TO MARQUETTE TOOL & MANUFACTURING COMPANY, OF CHICAGO, ILLINOIS, A CORPORATION OF ILLINOIS.

WEIGHING AND SORTING MACHINE.

1,394,167.     Specification of Letters Patent.     Patented Oct. 18, 1921.

Application filed March 18, 1920. Serial No. 366,792.

*To all whom it may concern:*

Be it known that we, RUDOLPH W. GLASNER and MARTIN BALCKER, citizens of the United States, residing at Chicago, in the county of Cook and State of Illinois, have invented certain new and useful Improvements in Weighing and Sorting Machines, of which the following is a specification.

This invention relates to improvements in weighing and sorting machines and one of the objects of the same is to provide an improved apparatus by the use of which articles may be weighed and sorted or separated, so that the articles will be collected together in different groups, the articles of the respective groups being of substantially the same weight.

A further object is to provide an improved apparatus which will be compact and of a comparatively simple construction and effective, efficient, and automatic in operation.

To the attainment of these ends, and the accomplishment of other new and useful objects as will appear, the invention consists in the features of novelty, in substantially the construction, combination and arrangement of the several parts hereinafter more fully described and claimed and shown in the accompanying drawings illustrating this invention, and in which:

Figure 1 is a view in side elevation, partly broken away, of an apparatus embodying this invention.

Fig. 2 is an enlarged detail side elevation, partly broken away, of a portion of the apparatus.

Fig. 3 is a detail vertical sectional view taken on line 3—3 Fig. 2.

Fig. 4 is an end elevation.

Fig. 5 is a horizontal sectional view taken on line 5—5 Fig. 2.

Fig. 6 is an enlarged detail view, partly in elevation and partly in section showing the dumping mechanism in another position from that shown in Fig. 3.

Fig. 7 is a side elevation of Fig. 8.

Fig. 8 is a top plan view of Fig. 7.

Fig. 9 is a detail sectional view on line 9—9 Fig. 7.

Fig. 10 is a view of a detail.

Fig. 11 is an enlarged detail view partly in elevation, partly in section, and partly broken away showing the mounting or bearing for the article receptacle.

Fig. 12 is an enlarged view of a detail.

Fig. 13 is a sectional view on line 13—13 Fig. 12.

Fig. 14 is a view on line 14—14, Fig. 12.

Figs. 15, 16 and 17 are views of details.

The supporting structure may be of any desired size and construction but preferably embodies a plurality of spaced uprights 15 each of which embodies side members preferably connected by means of cross members 16, 17, and these uprights are spaced from each other for any desired distance and are connected by means of intermediate or spacing members 18, 19.

Supported by the frame thus formed at one end thereof, in any desirable or suitable manner are pulleys 20, 21 and supported by the frame at the other end thereof and mounted upon an adjustable member 22 are similar pulleys 23, 24. Over these pulleys passes an endless conveyer 25 and to which conveyer the article receiving receptacles, to be hereinafter described, are connected. The member 22 carrying the pulleys 23, 24 is adapted to be adjusted longitudinally with respect to the supporting structure in any suitable manner such as by means of adjusting screws or bolts 26 one end of which may be journaled in a suitable bracket 27 so that by adjusting them, the slack in the endless conveyers may be taken up. One set of the pulleys 20, 21, 23, 24 is arranged on each side of the machine, and the supporting structure may be of any desired width.

Motion is imparted to the endless conveyers in any suitable manner such as by means of a motor 27 having a pulley 28 on its shaft over which a belt 29 passes. This belt in turn passes over a pulley 30 to which is connected a gear 31. This gear in turn meshes with a gear 32 having connected therewith a gear 33 which in turn meshes with a gear 34 that is connected for rotation with the pulley 21.

Arranged intermediate the uprights 15 are hoppers or chutes 35 which are supported in any suitable manner so as to receive the articles which may be delivered thereto from the article carrier and these chutes are adapted to direct the articles to one side of the supporting structure.

Secured to the uprights 15, on each side of the supporting structure, and adjacent the top thereof are tracks or ways 36 which extend for the entire length of the supporting structure. Similar tracks or ways 37 are connected with the uprights adjacent the lower extremities thereof, and the pulleys 20, 21, 23 and 24 are arranged adjacent the ends of these tracks or ways and in such positions that the portions of the pulleys over which the endless conveyers pass, will form continuations of the tracks. Arranged also adjacent the lower portions of the uprights 15 and spaced below the tracks 37, for the pupose hereinafter set forth, are additional tracks 38 and supported adjacent the respective ends of the structure are guards 39, 40 which form continuations of the tracks 38. These guards are supported by the end members 41 at one end of the machine and by the adjustable member 22 at the other end of the machine. The ends of the guard 39 are curved as at 42, 43, the curved end 42 coinciding with and forming a continuation of the tracks 38 while the curved ends 43 extend over, are spaced from and are parallel with the peripheries of the pulleys 21. The lower ends of the guards 40 are curved as at 44 and overlap the adjacent end of the respective tracks 38 so that when the member 22 is adjusted in the manner as already described to take up the slack of the endless conveyers, the guards 40 will be adjusted and the curved ends 44 will be correspondingly adjusted with respect to the tracks 38 in such a manner that there will be no intervening space between the two. The upper ends 45 of the guards 40 extend over, are spaced from and are parallel with the peripheries of the pulleys 23.

To the upper ends of the uprights 15 and preferably at an elevation slightly above the top of the tracks or ways 36, are stationary track sections 46 having inclined or beveled lateral surfaces 47. Arranged intermediate adjacent uprights 15 are movable track sections 48 having beveled or inclined ends 49 which coöperate with the inclined faces 47 of the track sections 46. The beveled ends 49 of the track sections 48 are so arranged with respect to the inclined surface 47 that the track section 48 may be lowered with respect to the uprights 15 and the track section 46 coöperating with the inclined surfaces will serve to limit the upward movement of the track section 48 so that the upper surface of the track section 48 will not assume a position above the upper surface of the track section 46.

The track sections 48 coöperate and form a portion of a weighing mechanism and are so supported that when a predetermined weight moves upon and is supported by the track section 48 the section will lower, but when the weight is moved off the section it will rise and assume its normal position.

To that end, any suitable weighing mechanism may be provided, a simple and efficient mechanism embodies a series of levers 49, 50, 51, 52. The levers 49 and 50 are each provided with spaced arms and are arranged in opposition to each other. The extremities 53 of the arms of the lever 49 are fulcrumed upon stationary fulcrums or knife edges 54 (see particularly Figs. 2 and 5) and the extremities 55 of the arms of the lever 50 are fulcrumed upon similar stationary knife edges. These knife edges are mounted upon a suitable fixed support preferably the uprights 15. The ends 56 and 57 of the respective levers 49, 50 normally stand in a plane above the respective ends 53, 55 and above the fulcrums of the levers, while the extremities 58, 59 of the respective levers 51, 52 are arranged below the fulcrums 54, and these ends 58, 59 are respectively connected by means of links 60 with stationary knife edges 61. The extremities 62, 63 of the levers 51, 52 are deflected upwardly to project above the levers 50 to form a support for a platform 64 and upon which platform the weights are adapted to be placed, for controlling the weight by which the scale mechanism operates. The levers 50, 52 are connected by means of links 55 intermediate their ends similar to the links 66.

The end 57 of the lever 50 rests upon a knife edge 67 carried upon a link 68, the upper end of which link carries a knife edge 69 and connected with the upper end of the link 68 is another link 70 upon which the knife edge 69 has a bearing. The upper end of the link 70 is provided with a knife edge 71 having a bearing in one end of the lever 72 which latter is pivotally supported intermediate its end by means of a knife edge 73 having a bearing in a link 74 which latter is pivotally supported by means of a knife edge 75 connected with the cross member 17 of the upright 15. The other end 76 of the lever 72 is connected by means of knife edges and an intermediate link 77 to a shiftable member 78. The end 56 of the lever 49 is similarly connected to the end of a lever 79 which latter is in turn pivoted intermediate its ends to the support 17 in a manner similar to the lever 72 and is similarly connected by its free end with a member 78.

Thus it will be seen that the weighing mechanism thus constructed may be controlled to vary the amount of weight necessary to operate the same by changing the weight of the load carried upon the platform 64 and in order to shift the weighing mechanism it is necessary to depress or shift the member 78. When this member 78 is thus depressed, in a manner hereinafter to be set forth, the member 78 will, through the medium of the levers 72, 79 cause the weighing mechanism to operate. When the weight is removed to permit the member 78 to rise, the weighing mechanism will assume its normal position.

This member 78 (see particularly Figs.

3 and 10) is connected with the track section 48 and serves as a means for supporting the track section, and in order to permit freedom of movement and overcome friction of the member 78, there may be provided anti-friction rollers 80, 81 which are supported by a suitable bracket and are adapted to have bearings against the uprights 15.

It will thus be seen that when placing a weight upon the track section 48, the scale or weighing mechanism thus described will tend to raise the track section and the coöperating inclined surfaces 49, 47 will hold the upper surface of the track section flush with the top of the track section 46, so that a supporting carriage will pass from section 46 to the section 48, without causing a jar to the scale mechanism.

In order to hold the track section 48 in its elevated position, suitable temporary locking mechanisms may be provided such for instance as a bell crank lever pivotally mounted as at 82 and having an arm 83 which passes under the track section 48 to bear thereagainst and tend to support the track section. This is accomplished by means of a coil spring 84 one end of which is anchored to a suitable fixed support and the other end is connected with an arm 85 which latter in turn is connected with the arm 83. The tension of the spring 84 is such that it will hold the track section 48 in position but will yield against the movement of the bell crank lever when pressure is exerted upon the arm 86 in a manner to be set forth, and which arm 86 is connected with the bell crank lever.

Connected with the endless conveyers 25 are suitable supporting frames or carriages designated generally by the reference numeral 87 (see particularly Figs. 7 to 9) and which carriage may be of any suitable light construction and is provided with any suitable number of supporting wheels 88 journaled to the carriage and which wheels 88 run upon the stationary tracks 36. Any number of these carriages may be provided, according to the capacity of the machine and may be spaced from each other any suitable distance with respect to the conveyers 25.

Each of the carriages is provided, on opposite sides thereof with upright guides 89 having bearings 90 opening through the tops thereof and these guides 89 project for any suitable distance above the tops of the carriages and are arranged at any suitable point with respect to the length thereof. Arranged to move in the openings 90 of each of the uprights 89 is a bearing block 91 and in order to permit freedom of movement there may be provided a series of anti-friction rollers 92 journaled to each of the uprights 89 against which the blocks 91 have a bearing.

Mounted upon each of the carriages 87 is an article carrier or receptacle 93 which may be of any desired size and configuration but is preferably constructed of any suitable light material. This article carrier 93 is supported by means of trunnions 94 which have bearings in the bearing block 91 and support the carrier 93 in such a manner that a rotating or pivotal movement may be imparted to the carrier to dump the same with respect to the carriage at predetermined points in the travel of the carriage. Journaled upon each trunnion 94 is a supporting wheel 95 which is of any desired diameter and these wheels 95 are so positioned that they will run upon the movable track sections 48 and also upon the track sections 46.

It will, therefore, be seen that when the receptacle 93 contains an article, and if the article is of a predetermined weight to operate a predetermined mechanism or a predetermined section of the movable tracks 48, during the advancement of the receptacle, the carriage 87 will be supported by the stationary track 36, but if the weight of the article in the receptacle 93 is greater than the weight which maintains the track section 48 in its elevated position, the track section 48 will, when the rollers 95 are received thereupon, be depressed, it of course being understood that the bell crank lever is shifted so as to move the arm 84 from under the track section 48, and this will allow the wheel 95 together with the receptacle 93 to be lowered with respect to the carriage 87, inasmuch as the bearing 91 will move downward in the opening 90 in the uprights 89. This will depress the member 78 and will overcome or operate the weighing mechanism.

At this point in the operation, the receptacle 93 will be dumped, so as to deliver the article into one or the other of the chutes 35 according to the position of the carriage.

In order to shift the arm 83 from under the track section 48, as the carriage 87 advances, there may be provided a shoe 96 on the carriage which depends therebelow and engages the arm 86 and rocks the same against the stress of the coiled spring 84 and thereby relieves or releases the track section 48 to permit it to operate under a predetermined weight and in the manner just described.

It is of course understood that the shoes on the successive carriages will rock this arm and release the track section as each of the carriages passes thereover but unless the weight in the receptacle 93 is sufficient to overcome the scale mechanism or cause the latter to operate although the track section may be released, it will not be depressed under the stress of a lighter weight in the receptacle.

With this improved construction it will be manifest that any desired number of hoppers or chutes 35 may be employed according to the degree of separation it is desired to obtain, that is to say the number of hoppers controls the extent of separation and it will be obvious that the weighing mechanism of the respective hoppers is set according to the weight of the article which it is desired to deposit or deliver from the carrier into the respective hoppers or chutes.

As the article carrier reaches the point in the travel of the conveyer at which it is desired to deposit or deliver the article therefrom, any means may be provided for dumping the receptacle 93. A simple and efficient means embodies a gear-wheel 97 which is connected with one of the trunnions 94 and arranged along the path of movement of the gear 97 by the conveyer and adjacent each of the hoppers 35, is a rack 98 which is connected with an arm 99 pivotally supported as at 100 to a suitable bracket, so that when the arm 99 is moved about the pivot 100, the rack 98 will move into the path of movement of the gear 97, and as the conveyer and receptacles 93 are then advanced it will be manifest that the gear 97 which is connected with the trunnion 94 will engage the rack 98 and as the conveyer is advanced the gear 97 will be rotated by the rack. As the rack 98 comes in contact with gear 97 for rotation thereby it will be manifest that as the gear is rotated the receptacle 93 will be dumped and the article will be delivered therefrom into the hopper 35. Inasmuch as the arm 99 and rack 98 move in unison with the member 78, and as the arm 99 is pivotally mounted as at 100, it will be manifest that unless means are provided for maintaining the arm 99 in a fixed relative position with respect to the member 78, the distance between the member 78 and the arm would vary during the operation of the parts and the rack 98 would be given such movement that injury might be caused to some parts due to the fact that the arm 99 would fall over the pivot one way or the other when the member 78 reached a predetermined position. In order to obviate these difficulties and objections there is provided means for causing the member 78 and the arm 99 to maintain a fixed relative position. To that end the arm 99 is provided with a suitable extension 101 which is preferably of a bifurcated construction comprising spaced portions $101^a$ having alined bearings. Passing through these bearings in the portions $101^a$ is a pin 102 having a centrally disposed knife edge $102^a$ and spaced knife edges $102^b$ located on opposite sides of the knife edge $102^a$, and these knife edges $102^b$ are opposed to the knife edge $102^a$.

Carried by the movable member 78 are spaced brackets 103 having a pin $103^a$ mounted thereon and which pin is similar to the pin 102. This pin $103^a$ is provided with a knife edge $103^b$ arranged in alinement with and opposed to the knife edge $102^a$ of the pin 102, and is also provided with spaced knife edges $103^c$ on opposite side of the knife edge $103^b$ in alinement with and facing the knife edges $102^b$.

Two leaf springs 104 preferably of a semi-circular configuration are provided with bearing points $104^a$ and $104^b$. These springs 104 are adapted to be inserted between the pins 102 and $103^a$ so that the bearings $104^a$ of the springs will engage the respective knife edges $102^b$ and the bearings $104^b$ of the springs will engage the knife edges $103^a$ and the springs will operate at all times to maintain the pins 102 and $103^a$ in a fixed spaced relative position. In order to assist the springs in this operation and to cause the parts to always assume this position a link $104^c$ is provided. This link is of an open construction and is provided with bearings $104^d$ and $104^e$ which are adapted to engage over the pins 102 and $103^a$ intermediate the springs 104 so that the bearing $104^d$ will engage the knife edge $102^a$ and the bearing $104^e$ will engage the knife edge $103^b$ of the pin $103^a$. It will therefore be manifest that with this construction the springs 104 will tend to always maintain the pins 102 and $103^a$ separated and the springs 104 will hold these knife edges or pins 102 and $103^a$ in the same relative position with respect to each other so that when the member 78 moves the relative positions of the knife edges or pins 102 and $103^a$ will not be changed, as any change in the relative position thereof would cause a change of leverage or action of the scale mechanism and would impart a movement thereto other than the desired movement. In other words by the use of the springs 104 and the link $104^c$ with the associated parts, the weighing mechanism will always operate accurately but with their use the operation of the weighing mechanism would not be accurate and would be unreliable in action.

When the member 78 is depressed the link $104^c$ will cause the arm 99 and rack 98 to be moved about the pivot 100 so as to position the rack to engage the gear 97, and when the scale mechanism rises it returns the member 78 to its normal position due to the relieving of the track section 48 of the weight of the article, the springs 104 operating to hold the knife edges against the bearings in the links, it will be manifest that the arm 99 will also be moved by the movement of the member 78 and this will cause the rack 98 to move into an inoperative position or into the position shown in Fig. 3 so that the rack 98 will be out of the path of the movement of the gear 97 to permit the article receptacle to advance without being dumped.

As the articles are delivered through the hoppers or chutes 35, any suitable mechanism may be provided, if desired for registering or counting the number of articles thus delivered. To that end there may be provided on the end of each of the hoppers, a gate 105 which is arranged to assume a normally closed position but will yield when engaged by the article to allow the latter to pass. This opening and closing of the gate 105 may be employed as a means for counting the articles and to that end a recorder 105ª may be operatively connected with the gate 104.

Any suitable receptacle may be provided for collecting the articles from the respective chutes.

It is thought that the operation of this improved machine will be readily understood from the foregoing description but briefly stated it is as follows:

The respective scales or weighing mechanisms are adjusted to any predetermined weight, each of the hoppers being controlled by the weighing mechanism adjusted for different weights. The scales are so set that the lighter articles will be delivered to the remotest hopper, that is to say the heavier articles will be delivered to the first hopper and as the articles decrease in weight they will be delivered to the next successive hoppers so that the receptacle containing a lighter article will pass over the weighing mechanism for the heavier articles until it reaches the mechanism set for the predetermined weight of the article to be delivered.

The conveyer travels in the direction indicated by the arrow in Fig. 1, and one article is placed in each of the receptacles. The article will remain in the receptacle until it reaches the movable sections 48 of the tracks which are adjusted to a predetermined and corresponding weight of the article in the receptacle. As the carriage 87 passes upon the movable track section 48 the arm 83 will hold the track section against movement until the carriage 87 is entirely upon the track section and a further movement of the carriage with respect to the track section will rock the arm to release the track section 48 and, if the article in the receptacle is of the proper weight, it will depress the track section 48 and cause the receptacle 93, together with the wheel 95 and gear 97 to be lowered with respect to the carriage 87, due to the fact that the bearing block 92 will move in the bearing 90. As this operation takes place, the track section 48 will depress the member 78 and overcome the weight to which the respective scale has been set. This depressing of the member 78 will permit the arm 99 to move from the position shown in Fig. 3 to the position shown in Fig. 6 so that the rack 98 will be in a position to engage the gear 97. When the rack does engage the gear, and as the receptacle 93 advances, the gear 97 will be rotated and this in turn will rotate the trunnions 94 and dump the receptacle 93. Immediately the article is delivered from the receptacle, the weighing mechanism will overcome the weight of the receptacle 93 and its attached parts and will cause the member 78 to move upwardly to raise the track section 48 and likewise the wheel 95, gear 97, and bearing block 92 so that the receptacle can be then advanced. This return movement will occur while the carriage is still supported by the track section 48 but after the gear 97 has passed out of mesh with the gear 98.

As the carriage leaves the tracks 36, the wheels 45 will engage the guards 40 at one end of the supporting structure and pass thereover until they pass upon the portion 44 of the guard supported thereby and then between the tracks 38 and 37. At the other end of the supporting structure the rollers 95 will engage the curved portions 42, 43 of the guards 39 so as to hold the parts in the proper position.

While the preferred form of the invention has been herein shown and described it is to be understood that many changes may be made in the details of construction and in the combination and arrangement of the several parts, within the scope of the claims without departing from the spirit of this invention, such for instance as a different form of weighing or counter-balancing mechanism and other specific means for tripping or dumping the receptacles.

What is claimed as new is:—

1. The combination of article sorting means, weighing mechanism for weighing the articles and means automatically movable into and out of operative position by the weight of the articles and operating to automatically deliver the articles from the weighing mechanism as they are weighed.

2. The combination of weighing means, embodying article holding means, means for actuating the said holding means to deliver the articles therefrom and from the weighing means at predetermined points in the operation of the said holding means, the second recited means embodying a controlling device carried by the said holding means, and actuating means arranged along the path of travel of the holding means and controlled by the said controlling device.

3. The combination of weighing means, a carrier for conveying the article to the weighing means, and means whereby an article of a predetermined weight will actuate the said conveying means to deliver the article from the conveying means, the second recited means embodying mechanism automatically rendered active and inactive and controlled by the weight of the article.

4. The combination of weighing means, a carrier for conveying the articles to the weighing means, means adjacent the path of movement of the carrier for actuating the carrier to deliver the article therefrom, means tending normally to render the second recited means inactive, and means controlled by the weight of the article to render the second recited means active.

5. The combination of weighing means, a carrier for conveying the articles to the weighing means, means adjacent the path of movement of the carrier for actuating the carrier to deliver the article therefrom, means tending normally to render the second recited means inactive, and means controlled by the weight of the article to render the second recited means active, the second recited means embodying a gear and rack construction one of which is shiftable with relation to the other to render the same active and inactive.

6. The combination of weighing means, a carrier for conveying the articles to the weighing means, means adjacent the path of movement of the carrier for actuating the carrier to deliver the article therefrom, means tending normally to render the second recited means inactive, means controlled by the weight of the article to render the second recited means active, means for temporarily locking the second recited means inactive, and means for rendering the locking means inactive at a predetermined point in the travel of the said carrier.

7. The combination of weighing means, a carrier for conveying the articles to the weighing means, normally inactive means adjacent the path of movement of the carrier for delivering the article from the carrier, and an operative connection between the second recited means and the said weighing means whereby the second recited means will be controlled in its operation by the weight of the article.

8. The combination of weighing means, a runway adjacent thereto, a carriage movable upon the runway, an article holder mounted upon the carriage for a bodily shifting movement with respect thereto, means whereby the bodily shifting movement of the article holder will cause the weighing mechanism to actuate, and means whereby the said bodily shifting movement of the article holder with respect to the carriage will cause the article to be delivered from the article holder.

9. The combination of weighing means, a runway adjacent thereto, a carriage movable upon the runway, an article holder mounted upon the carriage for a bodily shifting movement with respect thereto, means whereby the bodily shifting movement of the article holder will cause the weighing mechanism to actuate, means whereby the said bodily shifting movement of the article holder with respect to the carriage will cause the article to be delivered from the article holder, means for temporarily locking the said weighing means against operation, and means for rendering the locking means inactive when the said carrier is in a position to have the article delivered therefrom.

10. The combination of weighing means, a runway adjacent thereto, a carriage movable upon the runway, means for propelling the carriage, the weight of the carriage and the propelling means therefor being supported by the said runway, a supplemental and shiftable track section operatively connected with the weighing means, an article holder mounted upon the carriage for a bodily movement with respect thereto, means connected with the carriage and operable upon the shiftable track section to shift the latter, and means for delivering the article from the carrier when the said track section is shifted thereby.

11. The combination of weighing means, a runway adjacent thereto, a carriage movable upon the runway, means for propelling the carriage, the weight of the carriage and the propelling means therefor being supported by the said runway, a supplemental and shiftable track section operatively connected with the weighing means, an article holder mounted upon the carriage for a bodily movement with respect thereto, means connected with the carriage and operable upon the shiftable track section to shift the latter, means for delivering the article from the carrier when the said track section is shifted thereby, means for temporarily locking the said track section against a shifting movement, and means for rendering the said locking means inactive.

12. The combination of weighing means, a runway adjacent thereto, a carriage movable upon the runway, means for propelling the carriage, the weight of the carriage and the propelling means therefor being supported by the said runway, a supplemental and shiftable track section operatively connected with the weighing means, an article holder mounted upon the carriage for a bodily movement with respect thereto, means connected with the carriage and operable upon the shiftable track section to shift the latter, means for delivering the article from the carrier when the said track section is shifted thereby, means for temporarily locking the said track section against a shifting movement, and means operatively connected with the said carriage for rendering the said locking means inactive.

13. The combination of weighing means, a runway adjacent thereto, a carriage movable upon the runway, means for propelling the carriage, the weight of the carriage and the propelling means therefor being supported by the said runway, a supplemental and shiftable track section operatively connected with the said weighing means, an article holder, shiftable bearings for the holder, roller guides for the bearings whereby the article holder is adapted for a bodily shiftable movement with respect to the carriage, means connected with the said holder and operable upon the said track section for shifting the latter as the holder is bodily shifted with respect to the carriage, and means for delivering the article from the said holder as the said track section is shifted.

14. The combination of weighing means, a runway adjacent thereto, a carriage movable upon the runway, means for propelling the carriage, the weight of the carriage and the propelling means therefor being supported by the said runway, a supplemental and shiftable track section operatively connected with the said weighing means, an article holder, shiftable bearings for the holder, roller guides for the bearings whereby the article holder is adapted for a bodily shiftable movement with respect to the carriage, means connected with the said holder and operable upon the said track section for shifting the latter as the holder is bodily shifted with respect to the carriage, and means responsive in its operation to the shifting of the said track section for delivering the article from the said holder.

15. The combination of weighing means, a runway adjacent thereto, a carriage movable upon the runway, means for propelling the carriage, the weight of the carriage and the propelling means therefor being supported by the said runway, a supplemental and shiftable track section operatively connected with the said weighing means, an article holder, shiftable bearings for the holder, roller guides for the bearings whereby the article holder is adapted for a bodily shiftable movement with respect to the carriage, means connected with the said holder and operable upon the said track section for shifting the latter as the holder is bodily shifted with respect to the carriage, a gear and rack for imparting another and different movement to the said holder with respect to the carriage to deliver the article therefrom, one of the parts of the gear and rack being connected with the said holder and the other part being operatively connected with the weighing means whereby the actuation of the weighing means will render the gear and rack operative with respect to each other.

16. A weighing and sorting apparatus embodying article holding means, selecting means for gathering together predetermined articles, means controlled by the weight of the articles for rendering active the said selecting means, means for temporarily locking the said selecting means inactive, and means for rendering inactive the said locking means.

17. A sorting apparatus embodying delivery mechanism having a plurality of points of discharge, normally inoperative means for weighing the articles, and means controlled by the weight of the articles and operating to automatically select the point of delivery of the article and render the weighing means operative whereby articles of predetermined weights will be grouped.

18. The combination of article carrying means, article delivering points arranged along the path of movement of the said carrying means, normally inoperative weighing means for controlling the delivery of the article at predetermined points, and means controlled by the weight of the article for rendering the said weighing means operative.

19. The combination of article carrying means, article delivery points arranged along the path of movement of the said carrying means, weighing means for controlling the delivery of the article at predetermined points, means controlled by the weight of the article for rendering the said weighing means active, means for temporarily locking the said weighing means against operation, and means for rendering the said locking means inactive.

In testimony whereof we have signed our names to this specification, on this 28th day of February, A. D. 1920.

RUDOLPH W. GLASNER.
MARTIN BALCKER.